United States Patent [19]

Bonora et al.

[11] 4,077,485

[45] Mar. 7, 1978

[54] VEHICLE BATTERY MOUNTING APPARATUS

[75] Inventors: Anthony C. Bonora; Thomas D. Holt, both of Palo Alto, Calif.

[73] Assignee: Bolt Vehicles, Incorporated, Sunnyvale, Calif.

[21] Appl. No.: 645,834

[22] Filed: Dec. 31, 1975

[51] Int. Cl.² .......................................... B62D 25/00
[52] U.S. Cl. ............................. 180/68.5; 74/242.15 B; 180/33 A; 180/34; 180/65 R
[58] Field of Search ................. 180/33 R, 33 A, 33 B, 180/33 C, 33 D, 33 E, 34, 30, 68.5, 65 R, 65 A; 280/289 R; 74/242.15 R, 242.15 B, 242.13 R

[56] References Cited

U.S. PATENT DOCUMENTS

| 613,732 | 11/1898 | Steffens | 180/34 X |
|---|---|---|---|
| 675,458 | 6/1901 | White | 180/33 C |
| 1,259,219 | 3/1918 | Evans | 180/33 A |
| 1,386,354 | 8/1921 | Owen | 180/33 A |
| 1,439,430 | 12/1922 | Lyhne | 180/68.5 X |
| 1,460,811 | 7/1923 | Caleno | 180/33 R |
| 1,461,869 | 7/1923 | Franzenburg | 180/33 R |
| 2,179,418 | 11/1939 | McDonald | 180/34 X |
| 2,743,783 | 1/1956 | Kreidler | 180/33 R |
| 3,701,544 | 10/1972 | Stankovich | 280/276 |
| 3,773,131 | 11/1973 | Jaulmes | 180/33 C X |

FOREIGN PATENT DOCUMENTS

| 22,148 | 6/1936 | Australia | 280/289 R |
|---|---|---|---|
| 547,162 | 5/1956 | Belgium | 180/34 |
| 874,234 | 7/1942 | France | 180/33 C |
| 1,162,186 | 9/1958 | France | 180/33 C |
| 307,124 | 4/1933 | Italy | 180/34 |

Primary Examiner—Joseph F. Peters, Jr.
Assistant Examiner—John P. Silverstrim
Attorney, Agent, or Firm—Darby & Darby

[57] ABSTRACT

Apparatus for mounting a battery on an electrically powered vehicle, as for example a bicycle, including a bracket slidably mounted on the vehicle frame upon which in turn are mounted one of the sprockets of a belt drive system and the battery, the weight of the battery urging the sprocket to tension the belt. The battery is mounted on the bracket by a hinge packed with a compressible resilient material to permit damped rotation of the battery about a transverse axis while dampingly constraining all other movement of the battery. The bracket is further provided with pad means having resilient frictional surfaces to absorb impact of the battery against the bracket and damp transverse movement of the battery.

6 Claims, 4 Drawing Figures

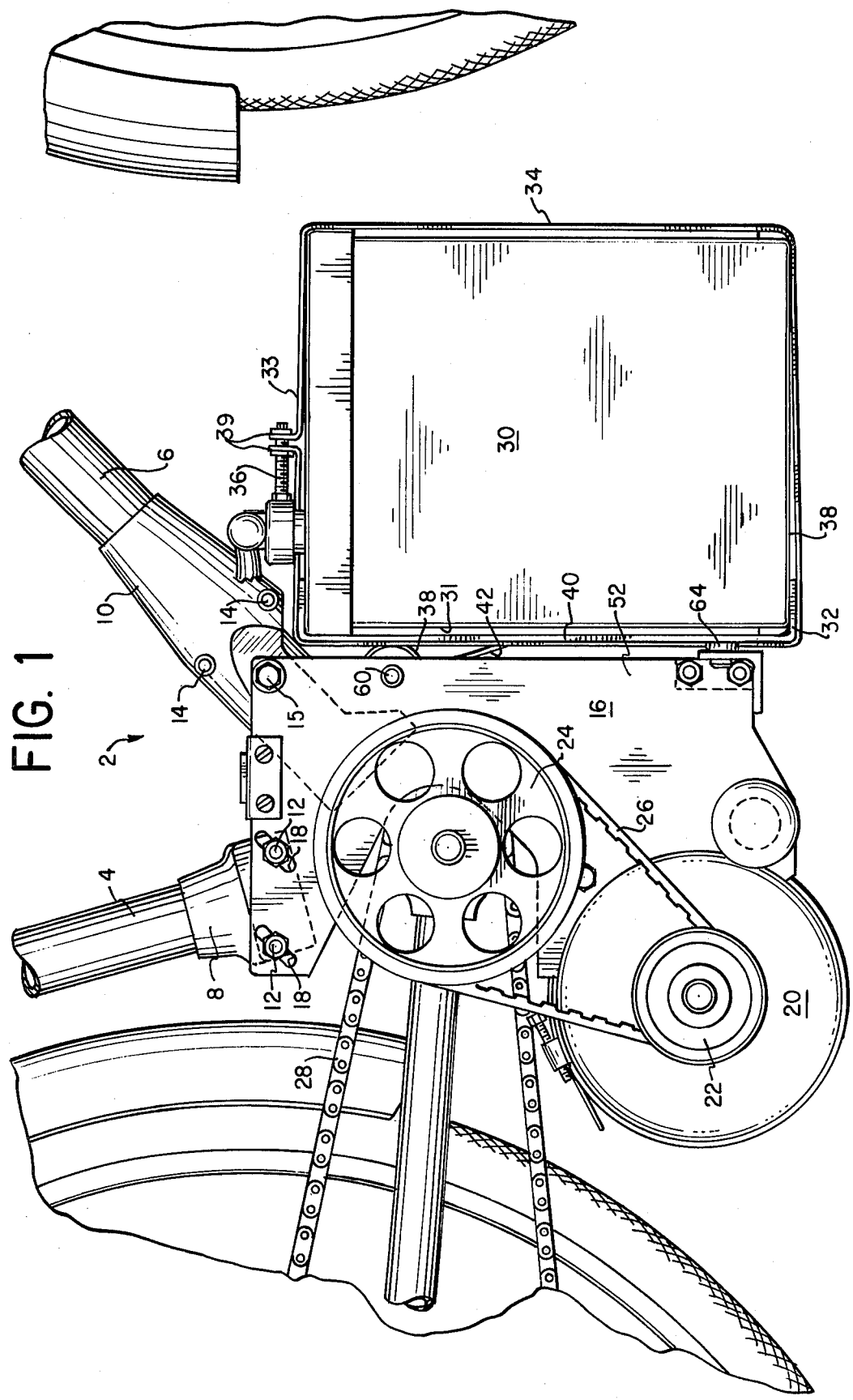

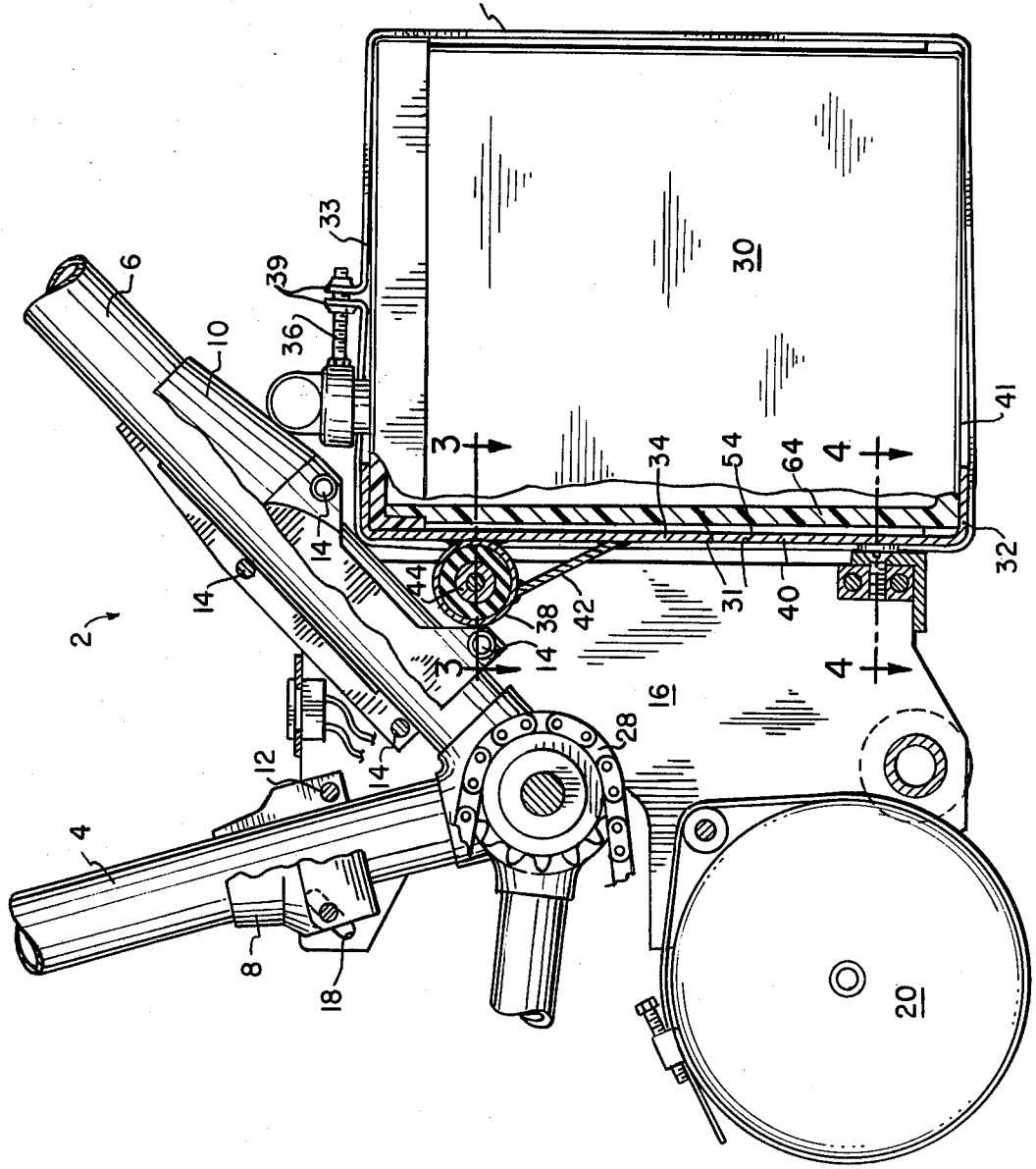

VEHICLE BATTERY MOUNTING APPARATUS

BACKGROUND OF THE INVENTION

A growing shortage of organic fuels and increasing awareness of the environmental hazards caused by their use in motor vehicles has made desirable the use of electrically powered vehicles. Due to an inability of the state of the art to produce a sufficient amount of power for vehicular propulsion from batteries, vehicles employing such power sources are generally of lightweight construction while the batteries are relatively large and heavy. The inertia of the batteries is often sufficient to place severe mechanical stresses on the vehicle chassis, capable of upsetting the vehicle or causing structural damage to it, when the vehicle is linearly or angularly accelerated or decelerated.

Lightweight vehicles of the type heretofore discussed often employ belt or chain drive power transmissions to transmit power from a motor to one or more of the vehicle's wheels. In such belt drive systems, either the motor shaft or transmission pulley or sprocket is movable, the belt being tensioned by spreading the pulleys or sprockets apart and frictionally locking them in place. The tension of the belt or chain tends to force the pulleys or sprockets toward one another thereby loosening the belt or chain. Relatively frequent adjustment is required in order to maintain adequate belt tension. It is therefore desirable to utilize the weight of the battery to tension the drive belt or chain.

SUMMARY OF THE INVENTION

The above-mentioned problems are overcome by the vehicle battery mounting apparatus of this invention which provides means for suspending a battery from the frame of an electrically driven vehicle having a belt or chain drive power transmission so that the weight of the battery tensions the belt or chain and so that the forces exerted by the battery on the vehicle frame do not overstress the frame or upset the vehicle when the vehicle is in motion. More specifically, the invention provides a bracket for supporting both the battery and one of the sprocket or pulley driving or driven components, preferably the motor.

The bracket is slidably connected to one or more longitudinal frame members having an axis with a vertical component and is joined to the longitudinal member by a releasable grasping means such as a clamp or collar which when loosened permits the bracket to slide along the longitudinal axis of the member. Means are also provided for attaching the battery to the bracket so that the battery may move relative to the vehicle when subjected to acceleration or deceleration caused by starting and stopping of the vehicle, changes in speed or direction of the vehicle, and bumps in the roadway.

The means for mounting the battery on the bracket include a hinge-like pivot having a longitudinal rod rigidly connected to the bracket and a sleeve, adapted to rotate about the rod, rigidly affixed to the battery. The axes of the rod and sleeve, and hence the pivot, are transverse to the length of the vehicle. A compressible resilient material is disposed inbetween the rod and sleeve. The pivot permits the battery to swing upward against the force of gravity and forward in the direction of vehicle travel when respective upward and forward forces are exerted on it. The compressible resilient material in the pivot mechanism also permits limited linear motion of the battery in all directions and rotation of the battery about axes other than the pivot rod axis. Motion of the battery is damped by the resilient medium employed in the hinge which absorbs stresses which would otherwise bear upon the vehicle frame.

The bracket is also provided with one or more platform-like projections against which one side of the battery normally rests urged by a moment about the pivot due to the weight of the battery. In addition to acting as stops for the battery, the projections which serve as rests have frictional surfaces which damp transverse motion of the battery.

To tension the drive belt or chain it is only necessary to loosen the collars or clamps holding the brackets in place on the longitudinal frame members so that the bracket may slide downward, urged by the weight of the battery, thereby tensioning the belt or chain. The collar or clamp is tightened to maintain belt or chain tension.

It is therefore an object of the invention to provide apparatus for mounting a battery on a belt or chain driven vehicle whereby the weight of the battery may be used to tension the belt or chain.

Another object of the invention is to provide apparatus for mounting a battery on a vehicle to absorb forces exerted on the vehicle due to the inertia of the battery which would otherwise upset the vehicle or overstress it.

Still another object of the invention is to provide apparatus for mounting a battery on a vehicle to constrain movement of the battery relative to the vehicle within permissible limits.

A further object of the invention is to provide apparatus for mounting a battery on a vehicle whereby movement of the battery relative to the vehicle is damped.

Other and further objects of the invention will be apparent from the following drawings and description of a preferred embodiment in which like reference numerals are used to identify like parts in the various views.

DESCRIPTION OF THE DRAWINGS

FIG. 1 is a fragmented right side elevation of a bicycle employing the invention;

FIG. 2 is a right side elevation of the invention in partial section;

FIG. 3 is a plan view in section taken along line 3—3 of FIG. 2; and

FIG. 4 is a plan view in section along line 4—4 of FIG. 2.

DESCRIPTION OF THE PREFERRED EMBODIMENT

Referring now to the drawings, specifically FIG. 1, a bicycle is shown having a frame 2 including downward sloping and converging cylindrical columns 4 and 6. The columns 4 and 6 are respectively circumscribed by collars 8 and 10 which are apertured to receive two bolts 12, and four bolts 14 respectively. The collars 8 and 10 are free to slide along respective columns 4 and 6 when the bolts 12 and 14 are loosened and frictionally engage columns 4 and 6 to prevent movement along them when the bolts 12 and 14 are tightened.

A mounting bracket 16 is joined to collar 8 via apertures in the mounting bracket 16 through which the bolts 12 are passed, and to collar 10 via an additional bolt 15. The bracket 16 comprises two parallel vertical plates 52 and 54. The bracket apertures by which the bracket 16 is attached to collar 8 are in the shape of slots 18 so that as the collars 8 and 10 converge and diverge with respective downward and upward movement along the columns 4 and 6 which movement is enabled by loosening the bolts 12 and 14 respectively, the bracket 16 permits collar 8 to move horizontally with respect to collar 10. Thus the rigid bracket 16 may be translated vertically along mutually oblique and converging columns 4 and 6. Tightening of the bolts 12 causes the bracket 16 to be securely clamped to collar 8 and collar 8 in turn to column 4.

The shaft of motor 20 drives a coaxial sprocket 22 which has disposed about the sprocket 22 and a remotely mounted drive gear 24 a teeth-bearing belt 26. The drive gear 24 in turn drives a power chain 28 which transmits the rotary power of the motor to the bicycle's rear wheel 29. The housing of the motor 20 is substantially rigidly connected to the bracket 16 for movement with it. The drive gear 24 is mounted on a rotary bearing, the outer race of which is rigidly connected to the bicycle frame so that the bracket when translated along columns 4 and 6 moves the sprocket 22 relative to the gear 24. The motor 20 with its sprocket 22 is positioned below drive gear 24 so that downward movement of the bracket 16 and motor 20 causes the sprocket 22 to tension the belt 26. Tensioning of the belt 26 is accomplished by loosening the bolts 12 and 14 thereby permitting the weight of the battery 30 to urge sprocket 22 away from drive gear 24 and then tightening bolts 12 and 14 to maintain the tension with the weight of the battery 30 counteracting the force in the tensioned belt 26 and thus assisting the bolts 12 and 14 in maintaining the tension.

Referring now to FIGS. 2, 3 and 4, a battery 30 has one of its sides 31 and portions of its top 33 and bottom 38 disposed in a C-shaped fitting 32 and held there in place by battery straps 34 which circumscribe the battery 30 and C-shape fitting 32 and are conventionally held together by screw means 36 threaded through upturned terminal portions 39 of the battery straps 34. Rigidly connected to the exterior of the vertical wall 40 of the C-shaped member 32, along the upper portion thereof, is a hollow cylindrical sleeve 38 which is further joined to the C-shaped fitting wall 40 by a strut 42. Disposed within the cylindrical sleeve 38 is a cylindrical spacer sleeve 44 separated from the sleeve 38 by two axially adjacent bushings 48 each formed from a compressible resilient material such as rubber or a suitable plastic. The spacer sleeve 44, bushings 48 and sleeve 38 share a common pivot axis 58 and form a hinge 59 which is sandwiched between parallel plates 52 and 54. The parallel plates 52 and 54 are apertured at their intersections with the pivot axis 58 to accept a bolt 60 passed through the hollow sleeve 44. The plates 52 and 54 are biased against the bushing ends 50 by a nut 62 on bolt 60. As the nut 62 and bolt 60 are tightened, the parallel plates 52 and 54 press on the ends of the resilient bushings 48 causing the bushings to bulge at their ends 50 which protrude axially beyond both ends of the sleeve 38. The sleeve 38 snugly circumscribes the resilient bushings 48 and partially compresses them about their circumferences in response to the radial expansion of the bushings 48 due to the axial pressure exerted on them by the plates 52 and 54.

As the battery 30 rotates about the axis 58 the rotary motion is damped by friction between the bushing ends 50 and the inner surfaces of plates 52 and 54, the outer circumferences of bushings 48 and the inner cylindrical wall of sleeve 38, and the circumference of spacer sleeve 44 and the inner cylindrical walls of bushings 48. In addition to the battery 30 being permitted to rotate with respect to bracket 16, the pivot mechanism allows limited translation of the battery 30 with respect to the bracket 16 in any direction and limited rotation of the battery about any axis other than pivot axis 58 within the range of compression of the resilient bushings 48. Thus the battery 30 can move linearly from side to side alternately compressing one of bushing ends 50 while respectively decompressing or extending the other of bushing ends 50. Linear movement of the battery 30 in a plane perpendicular to the pivot axis 58 causes the bushings 48 to compress radially thereby damping and limiting such movement. Linear movement in any other direction has respective components parallel and orthogonal to the pivot axis 58 and is damped and limited by the combined axial and radial compression of the bushings 48. Furthermore, rotation of the battery 30 about any axis other than the pivot axis 58 has associated with it a moment having force components incident upon the inner circumferences of the bushings 48 which again damps and constrains battery movement.

Provided at the lower portion of the bracket 16 and interfacing with the lower portion of the C-shaped fitting wall 40 are two laterally separated friction pads 64. The position of the pivot 59 on the side of the battery, laterally offset from the battery's center of gravity, results in a moment about the pivot axis 58, due to the weight of the battery, urging the battery against the friction pads 64. Thus the battery is normally constrained in an upright position by the hinge 59 and the friction pads 64. Decelerations of the bicycle or downward accelerations of sufficient magnitude cause the battery 30 to rotate temporarily upwardly and away from the friction pads 64. The battery is returned to its normal position, at rest against the friction pads 64, by the force of gravity. The friction pads 64 are preferably made of a compressible resilient material such as rubber or plastic to absorb the impact of the relatively heavy battery 30 which would otherwise be transmitted to the frame 2. The surfaces of the friction pads 64 interfacing with the wall 40 of the C-shaped fitting provide frictional damping of transverse battery motion, i.e. in a plane transverse to the length of the bicycle, either translational or rotational, thereby further preventing distortion of the bicycle frame and upset of the bicycle. The above described mounting arrangement also isolates the battery 30 from the bracket 16 and, hence, the motor sprocket 22 so that as the battery moves relative to the drive gear 24, parallelism between the drive gear 24 and sprocket 22 is maintained preventing the tensioned belt 26 from possibly slipping about or becoming disengaged from the sprocket 22.

It will be seen that variations of the invention may be made such as, for example, constraining the battery by one or more coil springs instead of the resilient hinge, without departing from its spirit and the scope of the invention is limited only by the appended claims.

What is claimed is:

1. In an electrically powered vehicle having a vehicle frame with a first generally vertical component, a battery, a motor powered by said battery, at least one powered wheel connected to said frame, a first sprocket operatively connected to said motor, a second sprocket operatively connected to said wheel, and means drivingly connecting said first sprocket to said second sprocket, the improvement comprising:

a bracket being slidably mounted relative to said first generally vertical component for translation therealong, releasable fastener means for selectively permitting when released and preventing when engaged translation of said bracket along said first component means for mounting one of said first and second sprockets to said bracket for movement therewith relative to said frame, means for mounting the other of said first and second sprockets to said frame, and, means for mounting said battery to said bracket for movement therewith relative to said frame, said battery mounting means including means for supporting said battery, and pivot means connecting said supporting means to said bracket, said pivot means including isolation means for preventing movement of said battery from causing movement of said one sprocket, said pivot means comprising an inner cylindrical member connected at its ends to one of said supporting means and said bracket, a compressible resilient material circumscribing the circumference of said inner cylindrical member, and a sleeve snugly circumscribing said compressible resilient material and connected to the other of said supporting means and said bracket, said pivot means permitting rotation of said battery about the axis of said inner cylindrical member, said compressible resilient material damping and limiting movement of said battery and absorbing the force of said battery due to said movement so that the battery force does not cause substantial movement of said one sprocket, said battery exerting a gravitational force on said bracket tending to urge said bracket-mounted sprocket away from said frame-mounted sprocket thereby tensioning said connecting means when translation of said slidably mounted bracket is permitted by said fastener means and thereafter preventing a decrease in the tension of said connecting means.

2. Apparatus according to claim 1 further comprising a friction pad rigidly mounted on said bracket, said friction pad having a frictional surface in a transverse plane, said supporting means being normally urged against said surface by the weight of said battery, whereby said battery is relatively free to rotate away from said friction pad about said axis, components of battery motion in said transverse plane being frictionally damped by said surfaces.

3. Apparatus according to claim 2 wherein said friction pad comprises a resilient compressible material to absorb the impact of said battery against said bracket.

4. In an electrically powered vehicle having a vehicle frame with a first generally vertical component, a battery, a motor powered by said battery, at least one powered wheel connected to said frame, a first sprocket operatively connected to said motor, a second sprocket operatively connected to said wheel, and means drivingly connecting said first sprocket to said second sprocket, the improvement comprising:

a bracket being slidably mounted relative to said first generally vertical component for translation therealong, releasable fastener means for selectively permitting when released and preventing when engaged translation of said bracket along said first component means for mounting one of said first and second sprockets to said bracket for movement therewith relative to said frame, means for mounting the other of said first and second sprockets to said frame, and, means for mounting said battery to said bracket for movement therewith relative to said frame, said battery mounting means including means for suspending said battery from said bracket, said suspension means being resilient in a vertical direction to allow limited damped vertical movement of said battery and said suspension means permitting rotation of said battery with respect to said bracket while absorbing the force attributable to battery movement for preventing movement of said one sprocket due to said battery movement, said battery exerting a gravitational force on said bracket tending to urge said bracket-mounted sprocket away from said frame-mounted sprocket thereby tensioning said connecting means when translation of said slidably mounted bracket is permitted by said fastener means and thereafter preventing a decrease in the tension of said connecting means.

5. Apparatus according to claim 4 further comprising a friction pad rigidly mounted on said bracket, said battery being urged against said friction pad by the weight of said battery whereby movement of said battery in a plane substantially parallel to the interface of said battery and said friction pad is damped.

6. Apparatus according to claim 5 wherein said friction pad comprises a resilient compressible material to absorb the impact of said battery against said bracket.

* * * * *